United States Patent [19]

Burke

[11] Patent Number: 4,627,144
[45] Date of Patent: Dec. 9, 1986

[54] METHOD OF MAKING PIN WITH MANGANESE STEEL SHROUD

[75] Inventor: James E. Burke, Philadelphia, Pa.
[73] Assignee: Wescott Steel, Inc., Trevose, Pa.
[21] Appl. No.: 709,503
[22] Filed: Mar. 8, 1985
[51] Int. Cl.⁴ .................. B23P 11/02; F16C 11/06
[52] U.S. Cl. .................... 29/447; 403/153
[58] Field of Search ............ 403/150, 151, 161, 273, 403/153, 154, 155; 29/149.5 C, 447; 384/280, 276; 474/228; 228/129, 148; 148/137

[56] References Cited

U.S. PATENT DOCUMENTS

| | | | |
|---|---|---|---|
| 441,884 | 12/1890 | Meyer | 228/129 |
| 998,210 | 7/1911 | Slentz | 403/154 |
| 2,185,483 | 1/1940 | Ward | 384/276 |
| 2,368,955 | 2/1945 | Weesner | 148/137 |
| 2,806,752 | 9/1957 | Ginn | 403/153 |
| 3,048,505 | 8/1962 | Doepken . | |
| 3,526,939 | 9/1970 | Nikkanen | 29/447 |
| 4,364,159 | 12/1982 | Holcombe | 29/447 |

*Primary Examiner*—Mark Rosenbaum
*Assistant Examiner*—Steven Nichols
*Attorney, Agent, or Firm*—Woodcock Washburn Kurtz Mackiewicz & Norris

[57] ABSTRACT

A pin for a bushing in a high wear, high abrasion, heavy loading joint is made with a manganese steel shroud forged into a groove in the center of a high strength alloy steel core. The shroud is heat-formed from a plate into a U-form which fits into the groove co-extensive with the area of wear. Grooves, or holes, for the retaining pins, or keepers, are formed in the high strength steel end portions of the pin.

14 Claims, 14 Drawing Figures

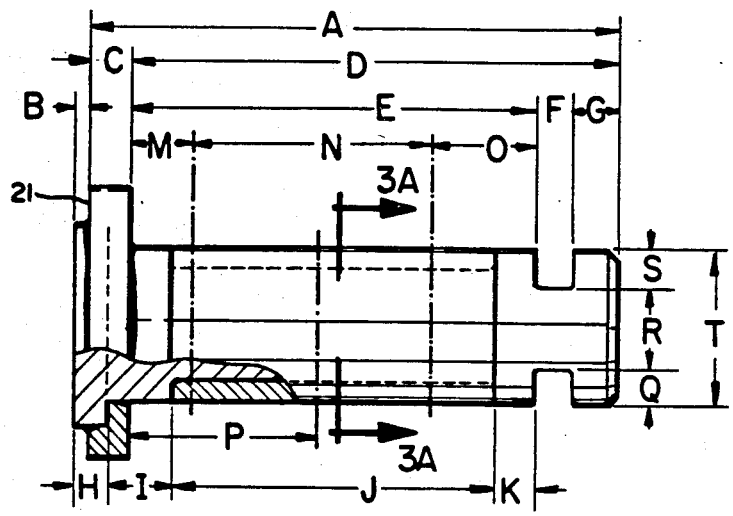
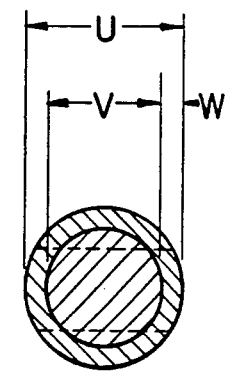
FIG. 3
FIG. 3A
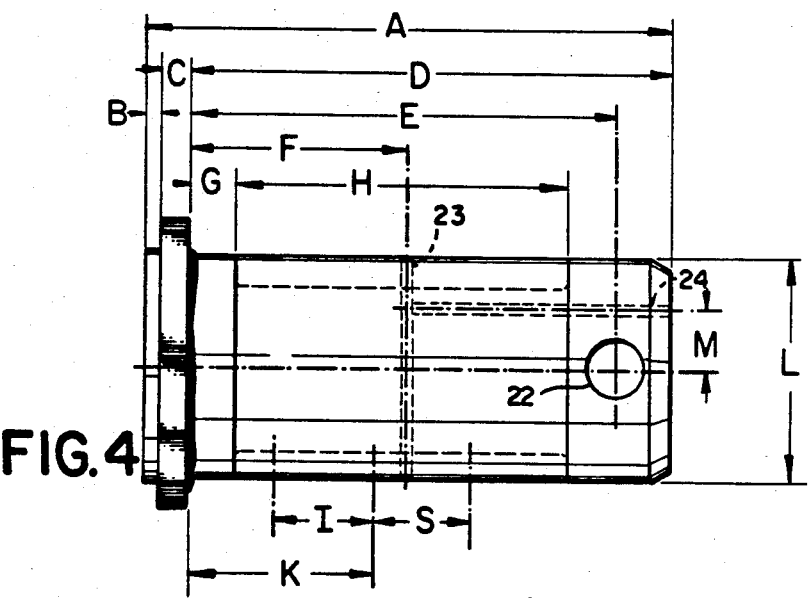
FIG. 4
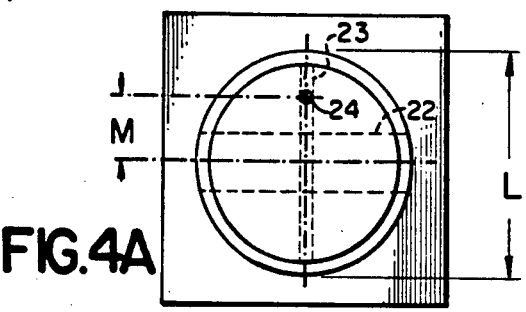
FIG. 4A

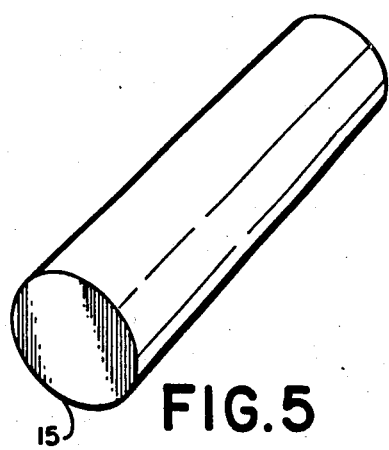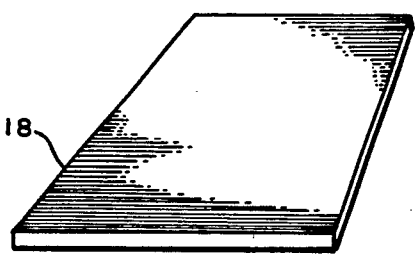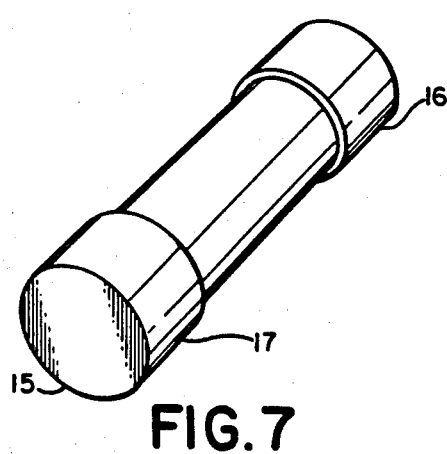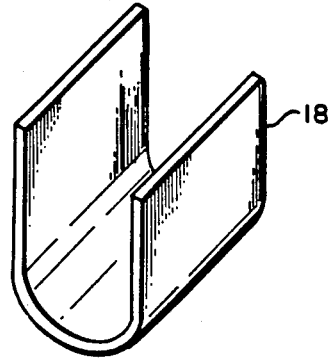

METHOD OF MAKING PIN WITH MANGANESE STEEL SHROUD

BACKGROUND OF THE INVENTION

This invention relates to methods of making pins which are used in joints at locations of high wear, heavy abrasion, little or no lubrication and extremely heavy loading.

Large earth moving equipment, such as drag line buckets, have joints with metal to metal contact between a bushing and a pin. Rigging and other machinery have such joints with rotational or sliding loads with extremely high wear. Pins of high strength alloy steel are typically used in these joints.

These pins are extremely large, up to 14" in diameter, and consequently, they are expensive. One common use of this equipment is in coal mining where the presently used pins typically have a wear life of 6-8 days. Maintenance including replacement of the pins brings about down time for very high cost equipment. This down time is very expensive.

Austenitic manganese steel is known for its good wear properties. U.S. Pat. No. 3,048,505 -Doepken, describes examples of austenitic manganese steel. Austenitic manganese steel is also well known for being difficult to work. For this reason, it has not been extensively used. Austenitic manganese steel bushings have been used in joints in the large equipment previously described.

Typically, in such applications, an austenitic manganese steel bushing may wear 3/16 of a inch in the time that a 10" diameter alloy steel pin is reduced to 7" in diameter by wear, and must be replaced. This has been accepted practice, because pins are much easier to replace than bushings, but the frequent replacement of pins remains a serious problem.

Attempts to use cast austenitic manganese steel in large diameter pins have not proven successful. For many reasons, large pins, over 6" diameter, cannot be fabricated entirely from austenitic manganese steel. The low strength characteristics as well as difficulty of working, preclude the use of such pins made entirely of austenitic manganese steel.

Prior attempts to place a shroud of manganese steel on the pin have also not been successful. The reason is that in the applications of use, the pin retainers, or keepers, exert a large axial stress on the pins. In prior pins with manganese shrouds, this has resulted in splitting of the shroud after short periods of use.

It is an object of the present invention to make a pin for heavy duty joints in large equipment, which pin has improved wear characteristics.

It is another object of the present invention to make such a pin with an austenitic manganese shroud which has improved wear characteristics, but is not subject to splitting caused by axial stress.

RELATED APPLICATIONS

Ser. No. 709,456, filed concurrently herewith, "MANGANESE STEEL SHROUD FOR BUSHING PIN", Burke, describes the bushing pin made in accordance with the present invention and is incorporated by reference herein.

SUMMARY OF THE INVENTION

In accordance with the present invention, a pin for a bushing is formed from a core of high strength, hardened alloy, steel. A uniform, reduced diameter groove is machined between larger diameter end sections at the extremities of the core. A plate of austenitic manganese steel is heat formed into a U-shape. The U-form is placed in the groove and the legs are forged around the reduced diameter of the core. The shroud shrinks on the core under carefully controlled conditions. Grooves or holes, for retainers or keepers, are formed in the end sections of the high strength, hardened alloy steel core. In this manner, a pin having a wear area of austenitic manganese steel is produced despite the difficulty of working the material.

The pin produced by the invention has great advantages over the prior art. Because the large axial forces exerted on the keepers are applied to the high strength, hardened alloy steel core, stress on the shroud is avoided. The austenitic manganese steel shroud is in the area of bushing wear, which the manganese steel resists quite well. No axial stress, which the manganese steel does not handle well, is applied to the shroud.

The shroud produced in accordance with the present invention has successfully increased the wear times of pins used in earth moving operations such as coal mining by about a five to one ratio.

The foregoing and other objects, features and advantages of the invention will be better understood from the following more detailed description and appended claims.

SHORT DESCRIPTION OF DRAWINGS

FIG. 3 is an alternate embodiment of the invention;

FIG. 3A is a section on the lines 3A—3A of FIG. 3;

FIG. 4 shows another embodiment of the invention;

FIG. 4A is an end view of the pin of FIG. 4;

FIG. 5 shows the bar from which the pin is fabricated;

FIG. 6 shows the plate from which the shroud is fabricated;

FIG. 7 shows the bar with the groove machined therein to form the pin;

FIG. 8 shows the plate formed into a U-shape;

DESCRIPTION OF THE PREFERRED EMBODIMENT

Figure 1:
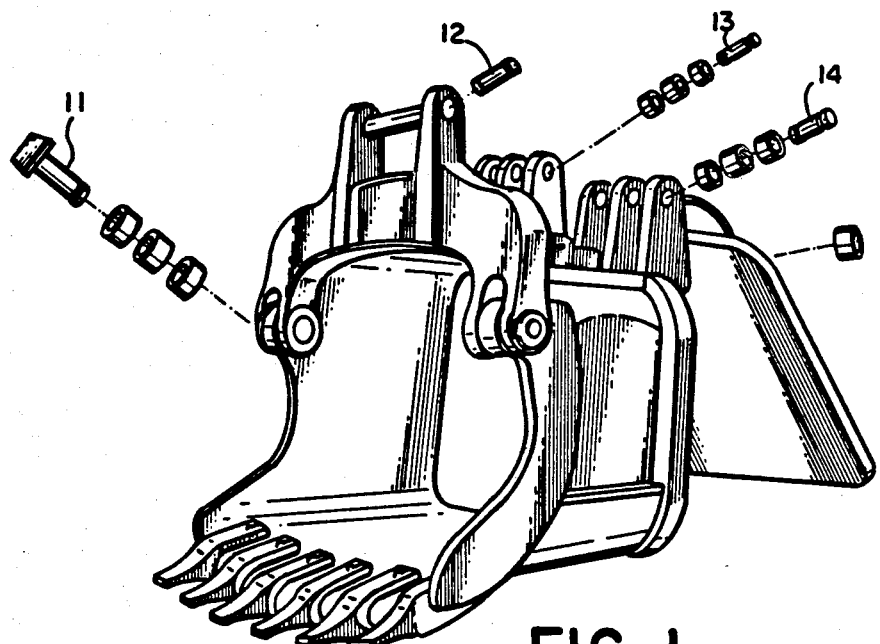
FIG. 1 shows an example of equipment in which the pins of the present invention are used.

The pins of the present invention are used in joints at locations of high wear, heavy abrasion, little or no lubrication, and extremely heavy loading. These include the pins 11-14 in the large earth moving drag line bucket shown in FIG. 1. Other applications include rigging and other machinery which has areas of metal to metal contact and wear with rotational or sliding loads.

Figure 2:
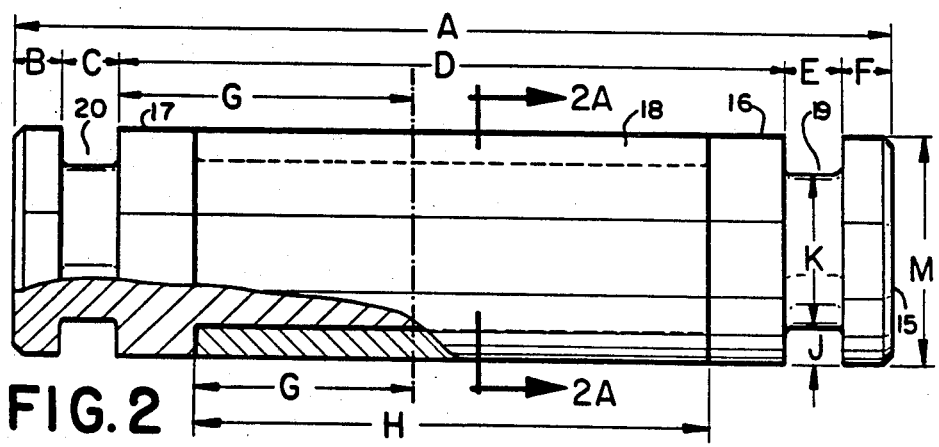
FIG. 2 shows a pin in accordance with the present invention.
Figure 2A:
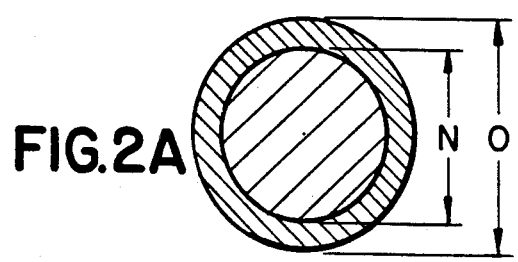
FIG. 2A is a section on the lines 2A—2A of FIG. 2.

As shown in FIG. 2, the pin includes a core 15 of high strength, hardened alloy steel. The core has a uniform reduced diameter groove in the center section between larger diameter end sections 16 and 17 at the extremities of the core.

A shroud 18 of austenitic manganese steel is in the groove, extending through, and beyond, the wear area of the bushing into which the pin is inserted. The means for holding the pin in the joint are located in the end sections of the pin. In FIG. 2, grooves 19 and 20 accommodate keepers for retaining the pin. These keepers exert opposed axial forces on the pin. By placing the grooves in the end sections of high strength, hardened, alloy steel, possible failure is avoided, which might otherwise occur if the keepers applied stress to the manganese steel shroud.

FIG. 3 shows a similar core, except that a head 21 is fitted and welded to the high strength, hardened, alloy steel end section.

FIG. 4 is similar, except that a hole 22 in the end section accommodates a keeper pin.

The pin of the present invention is fabricated as depicted in FIGS. 5-11.

In FIG. 5, the pin is fabricated from a cylindrical bar of commercially available, high strength alloy steel, such as 4340 or 4140 grade. In actual embodiments, the bar diameter ranges from 4" to well over 14" and the length from 9" to over 60". The bar is machined to uniformly reduce the diameter between the end sections.

The steel should have alloy and tempering (hardening) certifications.

The plate shown in FIG. 6 is austenitic manganese steel, commonly referred to as "Hadfield grade" manganese steel. In exemplary actual embodiments, the thickness varied from ½" to a maximum of 2½". The length of the insert is determined by the length of the overall pin and the length of the wear area. ASTM specifications A128-79A for cast steel also describe the wrought steel of this plate.

FIG. 7 shows the bar machined to reduce the diameter of the groove between the end sections 16 and 17. The reduced diameter must be held to a precise tolerance.

The plate is heat formed at a temperature of between 1750° F. and 1900° F. into a U-form shown in FIG. 8. The inner radii and parallelism are precisely controlled following a definite axis. The U-form plate as shown in FIG. 8, is placed in a slightly carbonizing atmosphere and thoroughly soaked at a temperature of 1950° F.

Figure 9:
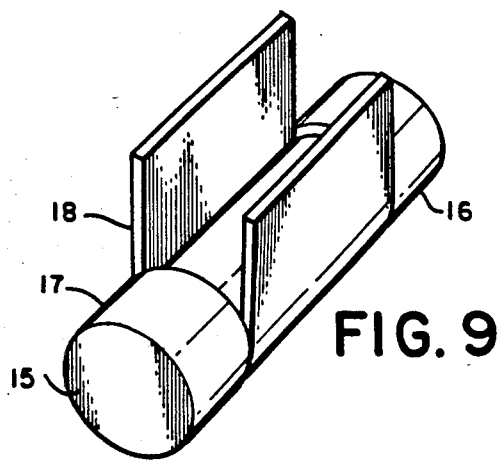
FIG. 9 shows the U-form sheet in the groove of the core.

As shown in FIG. 9, the prepared core and the U-configuration shroud are assembled with the radiused section of the U-form in the groove of the pin. The core is at ambient temperature and the manganese steel U-form is at 1950° F. The interaction must be carefully controlled.

Figure 10:
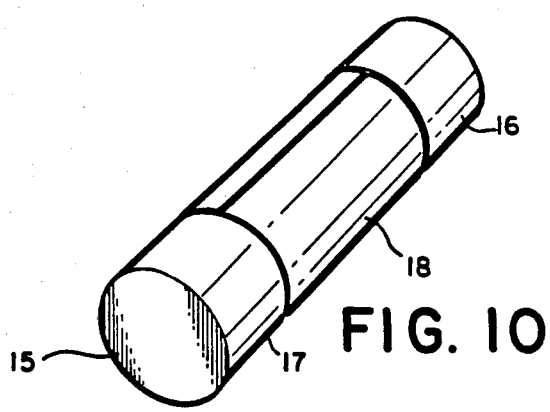
FIG. 10 shows the shroud forged into place on the pin.

As shown in FIG. 10, the legs of the U-form are closed, and forged into the accepting groove of the core. The true axis of both parts must be closely maintained in a rapid forming procedure. Speed is required for proper mating at a minimum heat loss to the manganese steel shroud 18. A heat loss not to exceed 100° F. is required. Similarly, the core must not be elevated in temperature by more than the certified tempering temperature.

Upon completion of the forging process, the assembled pin is water-quenched immediately. The core, at a maximum temperature of approximately 250° F., and the manganese steel shroud at a critical temperature of 850° F., are now brought to ambient temperature.

The pin provides the high strength properties of the alloy steel core as well as the excellent wear properties of the austenitic manganese steel. The method of joining provides a shrink fit, given the proper core diameter, shroud thickness, alloys involved, heat transfer, length of shroud, and design fit at corners. Because of this shrink fit, welding is not critical to join the two parts.

Figure 11:
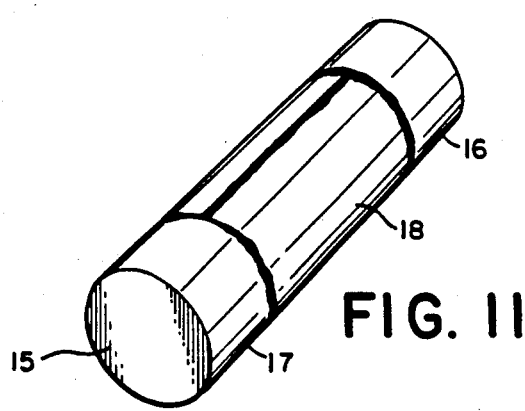
FIG. 11 shows the shroud welded onto the core of the pin.

As shown in FIG. 11, the joints are welded for cosmetic reasons and for the additional strength that the welding provides. The welding is performed under the welding codes of the American Welding Society for welding austenitic manganese steel to a dissimilar alloy steel. The pin is finished by machining or grinding it to conform a smooth, uniform diameter between the end sections and the shroud.

As shown in FIG. 11, the joints are welded for cosmetic reasons and for the additional strength that the welding provides. The welding is performed under the welding codes of the American Welding Society for welding austenitic manganese steel to a dissimilar alloy steel.

The pin is finished by machining or grinding it to conform a smooth, uniform diameter between the end sections and the shroud.

Forming the retaining grooves 19 and 20 of the hole 22 can be performed at any stage of the fabrication. The head 21 of FIG. 3 is preferably fitted and welded to the end section of the core after the shroud has been forced onto the core.

EXAMPLES

The manganese steel used in the shrouds of the following examples has the following properties:

| CHEMICAL PROPERTIES | |
|---|---|
| Carbon | 1.00–1.40% |
| Manganese | 11.00–14.00% |
| Silicon | 0.15–0.30% |
| Phosphorus | 0.06% Max. |
| Sulphur | 0.03% Max. |

| PHYSICAL PROPERTIES | | |
|---|---|---|
| Yield strength | 65,000 psi | |
| Ultimate strength | 150,000 psi | |
| Elongation in 2" | 35% | |
| Annealed hardness | 90–97 | Rockwell "B" |
| (as supplied) | or 185 | Brinell |
| Work Hardened | 55–65 | Rockwell "C" |
| (in service) | or 550 | Brinell |

EXAMPLE 1

A 9" diameter pin of the type shown in FIG. 2 for a Marion Power Shovel Model 8750 drag line was made from a high alloy steel core and a high carbon, 11–14% manganese steel shroud as described above. The dimensions of the pin were as (A) 30-½"+¼"-0
(B) 1-½"
(C) 1-5/16"
(D) 24-½"+0-⅛"
(E) 1-5/16"
(F) 1-½"
(G) 12-¼"
(H) 20"
(I) 10"
(J) 1"
(K) 7"±1/32"
(L) 1"
(M) 9"+0-0.075"
(N) 6-½"
(O) 9"+0-0.075"

The pin was used under normal heavy duty operating conditions for this type of machinery in coal mining. The pin was used for a total of about three months, whereas a comparable pin without the manganese steel shroud of this invention was used typically for about one fifth that time before requiring replacement.

EXAMPLE 2

A hoist trunnion pin, for a Bucyrus-Erie Model 4250 drag line of the type shown in FIG. 3 was made with an alloy steel 4340/4140 core and a high carbon, 11–14% manganese steel shroud. The dimensions were as follows:

(A) 42-¾"
(B) 1"
(C) 3"
(D) 38-¾"+⅛-0
(E) 31-½"+⅛-0
(F) 3-¼"+0-1/16"
(G) 4"
(H) 2-½"
(I) 6-½"
(J) 25-½"
(K) 3-½"
(L) 2-½"
(M) 5"
(N) 19-½"
(O) 7"
(P) 14-¾"
(Q) 2-¼"
(R) 7-½"
(S) 2-¼"
(T) 12"±0.005"
(U) 12"
(V) 9"
(W) 1-½"

The pin was used for about three months, whereas a comparable pin without the shroud of this invention was used for about one fifth that time in coal mining before requiring replacement.

EXAMPLE 3

A bale pin for a Bucyrus-Erie Model BE-1650 shovel, of the type shown in FIG. 4, was made from a 4140 steel core, an A-36 mild steel head, and a high carbon, 11–14% manganese steel shroud. The dimensions were as follows.

(A) 19-¾"+¼-0
(B) ½"
(C) 1"
(D) 18-¼"+⅛-0
(E) 16"+⅛-0
(F) 7-¾"
(G) 1-¾"
(H) 12"
(I) 3-⅞"
(J) 3-⅞"
(K) 6-⅝"
(L) 8.932"+0.010"-0.000
(M) 2-¼"

½" grease holes 23 and 24 were drilled. The bale pin has been used in normal coal mining operations since about June 1984 and is still in use.

While a particular embodiment of the invention has been shown and described, various modifications are within the true spirit and scope of the invention. The appended claims are, therefore, intended to cover all such modifications.

What is claimed is:

1. A method of making a pin for a bushing for a high wear, high abrasion, heavy loading joint comprising:
   heat forming a plate of austenitic manganese steel into a U form having a radiused section which matches the radius of a reduced diameter groove in a core of high strength, hardened alloy steel;
   assembling said U-form with its radiused section in the groove in said core;
   forging the legs of said U-form into the groove in said core to produce a shroud of austenitic manganese steel in said groove.

2. The method recited in claim 1 further comprising:
   shrink fitting said shroud onto said core by cooling after heat forming.

3. The method recited in claim 1 further comprising:
   machining a cylindrical bar of high strength, hardened alloy steel to produce said uniform, reduced diameter groove between larger diameter end sections at the extremities of said core.

4. The method recited in claim 1 further comprising:
   controlling the inner radii and parallelism of said plate during heat forming to follow an axis such that the radius of said U-section matches the radius of said groove in said core.

5. The method recited in claim 1 further comprising:
   forming means for retaining said pin in said joint in the larger diameter end sections of high strength, hardened alloy steel.

6. The method recited in claim 5 further comprising:
   machining an annular groove in said end section to accommodate a keeper for retaining said pin.

7. The method recited in claim 5 further comprising:
   fitting and welding a head to the end sections of high strength, hardened alloy steel.

8. The method recited in claim 1 further comprising:
   welding the seams between said shroud and said core.

9. The method recited in claim 1 wherein the step of heat forming is performed at a temperature between 1750° F. and 1900° F.

10. The method recited in claim 9 further comprising:
    heat soaking the U-form plate in a slightly carbonizing atmosphere at a temperature of approximately 1950° F.

11. The method recited in claim 1 wherein the step of assembling is carried out in a time such that the maximum heat loss to the manganese steel shroud does not exceed 100° F., and the core is not elevated in temperature by more than the certified tempering temperature.

12. The method recited in claim 1 further comprising:
    water quenching the pin after forging.

13. The method recited in claim 12 wherein said core is at a maximum temperature of approximately 250° F. and the manganese steel shroud is at a maximum temperature of 850° F. after water quenching.

14. The method recited in claim 1 further comprising:
    matching the axis of the radiused section of said U-form to the axis of said core during forging.

* * * * *